United States Patent
Brown et al.

(10) Patent No.: US 11,544,236 B2
(45) Date of Patent: Jan. 3, 2023

(54) MACHINE-LEARNING DRIVEN DATABASE MANAGEMENT

(71) Applicant: Teradata US, Inc., Dayton, OH (US)

(72) Inventors: Douglas Paul Brown, Rancho Santa Fe, CA (US); Preeti Javaji, San Diego, CA (US)

(73) Assignee: Teradata US, Inc., San Diego, CA (US)

(*) Notice: Subject to any disclaimer, the term of this patent is extended or adjusted under 35 U.S.C. 154(b) by 516 days.

(21) Appl. No.: 16/234,666

(22) Filed: Dec. 28, 2018

(65) Prior Publication Data

US 2020/0210387 A1    Jul. 2, 2020

(51) Int. Cl.
G06F 16/00 (2019.01)
G06F 16/21 (2019.01)
G06F 16/2453 (2019.01)
G06N 5/04 (2006.01)
G06N 20/00 (2019.01)

(52) U.S. Cl.
CPC ........ G06F 16/21 (2019.01); G06F 16/24542 (2019.01); G06N 5/04 (2013.01); G06N 20/00 (2019.01)

(58) Field of Classification Search
CPC .......................... G06F 16/21; G06F 16/24542
See application file for complete search history.

(56) References Cited

U.S. PATENT DOCUMENTS

2003/0163469 A1* 8/2003 Garth .................. G06F 16/20
2016/0203404 A1* 7/2016 Cherkasova ...... G06F 16/24532
                                                            706/12
2018/0314735 A1* 11/2018 Liu ........................ G06N 5/04

OTHER PUBLICATIONS

Ganapathi, A. (2009). Predicting and Optimizing System Utilization and Performance via Statistical Machine Learning. UC Berkeley. ProQuest ID: Ganapathi_berkeley_0028E_10216. Retrieved from https://escholarship.org/uc/item/9b92g2pz (Year: 2009).*

* cited by examiner

*Primary Examiner* — Khanh B Pham
(74) *Attorney, Agent, or Firm* — Howard Speight (57) ABSTRACT

A machine-learning driven Database Management System (DBMS) is provided. One or more machine-learning algorithms are trained on the database constructs and execution plans produced by a database optimizer for queries. The trained machine-learning algorithms provide predictors when supplied the constructs and plans for a given query. The predictors are processed by the DBMS to make resource, scheduling, and Service Level Agreement (SLA) compliance decisions with respect to the given query.

19 Claims, 4 Drawing Sheets

MACHINE-LEARNING DRIVEN DATABASE MANAGEMENT

BACKGROUND

Database management systems (DBMS) are complex pieces of software that execute elaborate, concurrent queries, which can read and write data on a single machine or in a shared-nothing Massively Parallel Processing (MPP) system of Multi-system environment. The DBMS may have Service Level Goals ("SLGs"), which are predefined sets of one or more performance criteria that are to be satisfied during execution of one or more queries. In this context, a "workload" can be a set of requests, which may include queries or utilities, such as, fast loading, multiple loading, etc. that have some common characteristics, such as, for example, application, source of request, type of query, priority, response time goals, etc. A database administrator ("DBA") may have parameters and "performance knobs" that can be adjusted to dedicate larger or smaller portions of computer system and DBMS resources based on ad hoc needs of the clients. Making these adjustments can be a challenge especially if the parameters and performance knobs are numerous or if they do not relate directly to actual business goals for the workloads themselves or if the settings established for one workload can contradict the settings established for other workloads.

Another important objective of databases, and in particular, a DBMS, is to optimize the performance of queries for access and manipulation of data stored in the database. Given a target environment, an "optimal" query plan can be selected as the best option by a database optimizer.

Ideally, an optimal query plan is a plan with the lowest cost (e.g., lowest response time, lowest Central Processing Unit (CPU) and/or Input/Output (I/O) processing cost, lowest network processing cost). The response time can be the amount of time it takes to complete the execution of a database operation, including a database request (e.g., a database query) in a given system. Today, query optimizers rely on manually derived formulas to estimate the cardinality of a query (or subquery) result and its total cost.

Query execution times and resource usage, however, are difficult to model, predict, and optimize. It is difficult to model the performance of a given physical query plan and even more difficult to select the best query plan to execute in the first place. At the heart of these problems is the ability of the database system to accurately estimate the cost and resource needs of a given query execution plan.

However, the least cost plan may not always be the best plan, which can be problematic for any Service Level Agreements (SLAs) that the database provider may have with a customer associated with the query.

SUMMARY

In various embodiments, methods and a system for machine-learning driven database management are provided.

In one embodiment, a method for machine-learning driven database management is provided. Database constructs generated by a database optimizer are inputted as an input to a trained machine-learning algorithm. A database operation predictor is obtained from the machine-learning algorithm as an output. At least one of the database constructs are modified based on the database operation predictor producing a modified database construct. The database operation is processed with the database constructs and the modified database construct.

DETAILED DESCRIPTION

Figure 1:
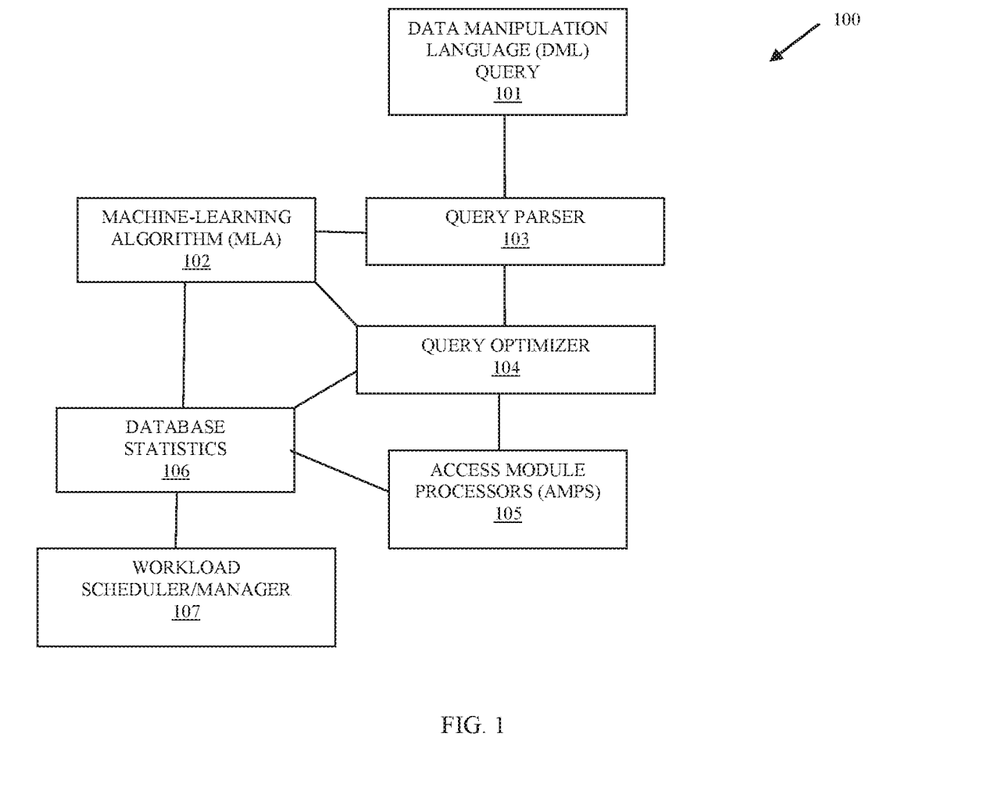
FIG. 1 is a diagram of a system for machine-learning driven database management, according to an embodiment.

FIG. 1 is a diagram of a system 100 for machine-learning driven database management, according to an embodiment. The system 100 is shown in greatly simplified form with just those components necessary for understanding the teachings of machine-learning driven database management being illustrated. It is to be noted that a variety of other components or less components can be employed without departing for the teachings of machine-learning driven database management presented herein and below.

The system 100 includes: a Data Manipulation Language (DML—such as Structured Query Language (SQL) query 101, a trained machine-learning algorithm (MLA) 102, a query parser 103, a query optimizer 105, one or more Access Module Processors (AMPs) 105, database statistics 106, and a workload scheduler/manager 107.

The components 101-107 are implemented as executable instructions that reside in a non-transitory computer-readable storage medium and are executed by one or more hardware processors of a DBMS. It is to be noted that each component may comprise multiple sub-components logically cooperating to form and perform the processing of the noted component.

As used herein, the terms and phrases "database," "database management system (DBMS)," and "data warehouse" may be used interchangeably and synonymously. That is, a data warehouse may be viewed as a collection of databases or a collection of data from diverse and different data sources that provides a centralized access and federated view of the data from the different data sources through the data warehouse (may be referred to as just "warehouse"). The DBMS includes a variety of database tools and operations to manage and provide database services.

As will be more completely discussed herein and below, the system 100 permits a trained MLA 102 to a variety of predicted values (predictors) to the database statics 106 for a given query 101 and its execution plan produced by the optimizer 104. These predicted values can then be contrasted with the execution plan and consumed by the workload schedule/manager 107 for a variety of purposes, such as and by way of example only, changing the execution plan to a different execution plan produced by the optimizer 104 for the query 101 but not selected because it was not the least cost plan; changing the hardware and software resources for the execution plan; changing the scheduling for the execution of the query 101; determining whether the query execution plan can even meet a Service Level Goal (SLG) of SLA for a customer; identifying problematic queries or hardware/software resources that execute the execution plan or portions of the plan; identifying similar queries 101 to the query 101 and contrasting portions of the two execution plans for improving costs associated with the execution plans, etc. The predictors provided by the MLA 102 may also be used in determinations made by the optimizer 140 when producing execution plans to improve both the processing time and resources needed by the optimizer 140 in producing plans and selection a least cost plan for a given query 101. Still further the predictors may be consumed to drive interface screens rendered on displays and viewed by Database Administrators (DBAs) to identify problem areas in the DBMS for query processing, loading, and other database operations.

It is to be noted that although the MLA 102 is identified as a single module, there may be a plurality of MLAs 102 each designed to provide a specific predictor or a set of predictors. These MLAs 102 can execute in parallel to one another and/or be chained together such that the predictors output by one MLA 102 is part of the input data processed by another MLA 102 to produce a different predictor.

The MLA 102 takes as input the DML constructs produced by the parser 103, the execution plans evaluated by the optimizer 104, and the selected least-cost execution plan determined by the optimizer 104. The MLA 102 is then trained on a plurality of queries 101 utilizing known results for those queries 101 (such as actual query execution times, actual I/O usage, actual parsing time, actual optimizing time, etc.). This allows the MLA 102 to derive factors from the input data to produce results as predictors for a given query 101 and its constructs and plans generated by the parser 103 and the optimizer 104 for that query 101. The factors allow the MLA 102 to derive calculations that when presented non-trained query constructs and query execution plans for a query 101 produces predictors for the query 101 and its execution plans as results. The predictors are then housed in the database statistics 106 and can drive database management operations (as discussed above).

Training the MLA 102 on the database constructs, the rewritten query, and execution plans (including the least-cost execution plan) produced by the parser 103 and the optimizer 104 allows for more accurate and more pertinent low-level information (including identification of specific hardware and software resources) to be used as the factors derived by the MLA 102, given more reliable predictors as output from the MLA 102.

In an embodiment, the predictors can then be processed to produce a model illustrating how resource allocations impacts actual query 101 performance. Such predictors produced by the MLA 102 may include predictions for queries 101 that show: hardware/software resource utilization, query result cardinalities (number of rows in intermediate tables needed to process the queries 101), and plan costs.

The predictors drive database operations by providing information that improves the DBMS's ability to more accurately identify costs and resource needs associated with a given query 101 and/or other database operations, such as loading, etc.

Furthermore, because the database constructs and rewritten queries 101 for text queries 101 are used as input for training the MLA 102, two different textual queries 101 that are functionally equivalent to a same query 101 can be readily identified. For consider a query 101 provided as:

```
SELECT "gender", AVG("income" AS "avg_income" FROM
twm_customer" Group BY "gender" WHERE "gender" = 'F';
```

While another query 101 is submitted as:

```
SELECT * FROM (SELECT "gender", AVG("income") AS "
avg_income" FROM "twm_customer" GROUP BY "gender")
"ovxzloibxc" WHERE ("gender" = 'F');
```

Text-based processing on these two queries may not be able to properly flag these two queries 101 as the same identical query 101. However, the optimizer 104 can and does rewrite both queries 101 to the same query 101.

Furthermore, query 101 processing time and resources consumed is eventually based on the plan the optimizer 104 chooses. Therefore, since resource prediction and workload management is the main goal of a DBMS, it is better to use the plan generated from the optimizer 104, then it is to use the text of the submitted query 101. In this way, the plan incorporates all the tiny details that really matter as the factors derived and considered by the MLA 102. Furthermore, the plan generated by the optimizer 104 identifies how many steps will be executed in parallel, how many spools are used, what kind of indexes are being used, what data is being redistributed and what data types are being compared. By the time query is optimized by the optimizer 104, all views, tables and aliases are resolved reducing the text clutter for the submitted query 101 any further.

Moreover, clusters of queries 101 can then be used to predict resource usage for "similar" queries 101. This technique can also be used to identify tactical and Decision Support System (DSS) queries 101 and manage them accordingly, further, it can be rolled up to the workload/user or application level to characterize it and understand it better and leverage the information to assign SLGs and SLAs.

In an embodiment, the predictors provided by the MLAs 102 are processed by a regulator component of the DBMS (such as Teradata® Active System Management (TASM®) feature or subsystem), which is responsible for controlling the performance of execution of requests (queries 101 or other database operations) to achieve SLGs both before a request begins execution and at periodic intervals during query 101 execution (i.e., the SLG-responsive element of the regulation). In this embodiment, based on these new machine-learning (ML) models (the trained and configured MLAs 102) provided by the system 100, the generated query 101 response time estimates, the resource estimates (CPU usage, I/O usage, and network usage), and/or other classification criteria for the workload, the regulator can use these new ML predictors to try and meet the SLG, or in some cases realize the SLG is not realistic and cannot be met. For example, the regulator may assign a given query 101 or request to one of the multiple workload groups that have been defined in the DBMS system. The assignment is based on accessing workload group rules (as defined by workload definitions) to match characteristics of the request as identified by the optimizer 104 with various workload definition rules. The workload group corresponding to the workload definition rules most closely matching the characteristics of the request is identified, where the incoming request (query 101 or other database operation) is assigned to the identified workload group. If there is an SLG assigned to the workload group then the regulator can use the ML predictors to make a decision to hold, delay, speed-up, slow-down, or execute the query 101.

In an embodiment, with more accurate ML predictors/estimates, the regulator can also perform dynamic throttling, where the regulator determines whether or not, an incoming request/query 101 is to be immediately scheduled for execution or whether the incoming request should be held for later execution. As part of the throttling performed, the regulator can also consider concurrency levels—the maximum number of concurrent executing requests from each workload group. The regulator monitors the concurrency levels of the workload groups, and if the concurrency level of the corresponding workload group (that the incoming request is assigned to) is above a predefined threshold (which means that there are too many concurrent executing requests for this workload group), then the incoming request for that workload group waits in a queue for later execution until the concurrency level for this workload group subsides below the defined threshold.

In an embodiment, the MLA 102 is trained as a linear-regression based machine-learning algorithm for purposes of provide a predictor/estimate for AMP 105 CPU execution time for plans produced by the optimizer 101 for a variety of queries 101. The input data used to train the MLA 102 is obtained from the execution plans provided by the optimizer 104 for the queries 101 and include: the number of execution steps in the plans, number of parsing steps, type of SQL statements used, single or multiple SQL statements, number of tables needed, number of columns in the tables, number of functions used, cardinalities of the tables used for the queries 101, number of spools used, costs determined by the optimizer 104 for each plan and each step of the plan, and the selected least cost plan determined by the optimizer for a given query 101. The actual AMP 105 CPU execution time observed is provided as the expected output.

In an embodiment, multiple MLAs 102 are trained to produce different predictors for query processing and/or database operations, such as but not limited to: actual CPU time, elapsed execution time, actual I/O usage, actual parsing time, actual optimizing time, actual load time, elapsed load time, etc.

In an embodiment, the predictors/estimates for queries 101 are maintained in the statistics 106 along with query identifiers, optimizer overall costs, actual overall costs, selected least cost plan, plans developed, resource identifiers for resources, each resource actual cost, each resource optimizer assigned costs, etc. The optimizer 104 and the workload scheduler/manager 107 obtain the queries 101 with the predictors/estimates along with the other information linked to the predictors/estimates to drive database operation and query processing decisions made by the optimizer 104 and the workload scheduler/manager 107.

These and other embodiments are now discussed with reference to the FIGS. 2-4.

Figure 2:
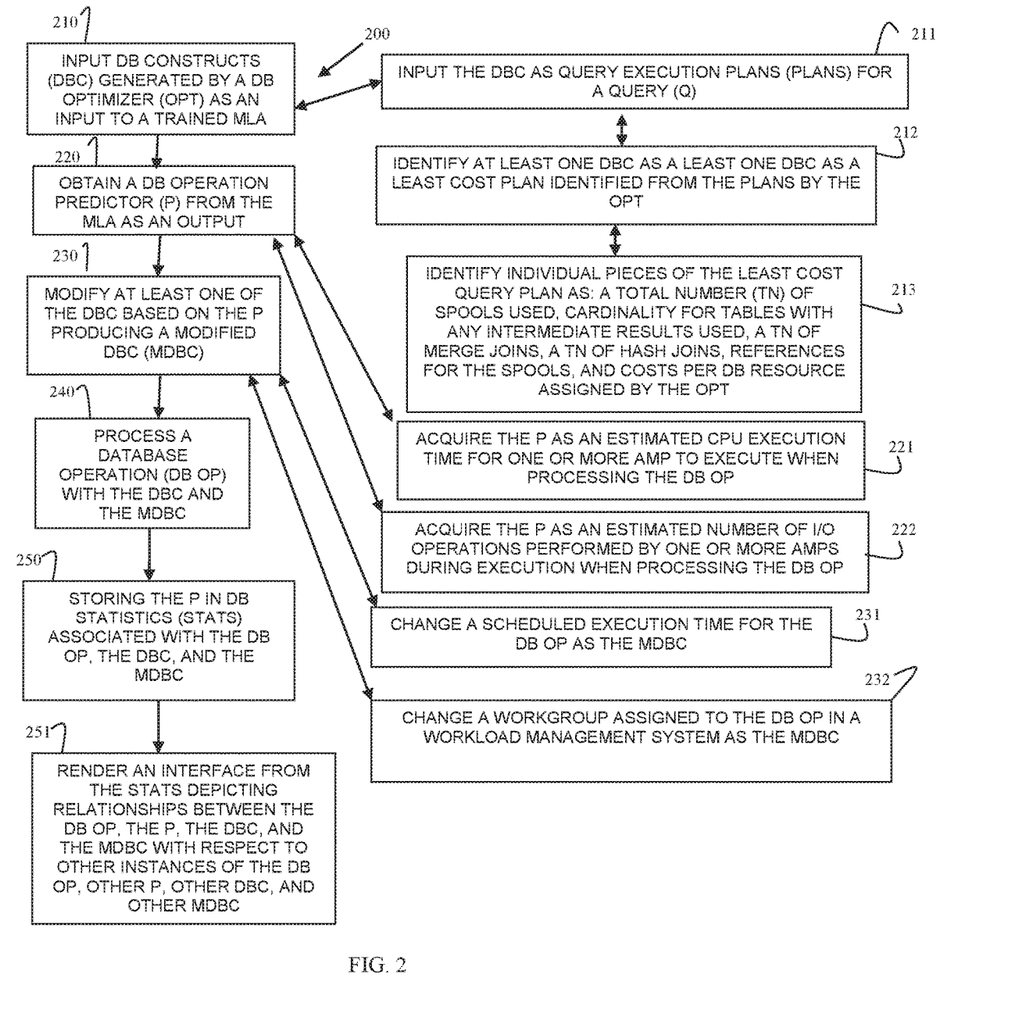
FIG. 2 is a diagram of a method for machine-learning driven database management, according to an example embodiment.

FIG. 2 is a diagram of a method 200 for machine-learning driven database management, according to an example embodiment. The method 200 is implemented as one or more software modules referred to as a "machine-learning driven DBMS"). The machine-learning driven DBMS represents executable instructions that are programmed within memory or a non-transitory computer-readable medium and executed by one or more hardware processors of one or more devices. The machine-learning driven DBMS may have access to one or more network connections during processing, which can be wired, wireless, or a combination of wired and wireless.

In an embodiment, the machine-learning driven DBMS executes on devices of a data warehouse across one or more physical devices or nodes (computing devices) or multi-systems for execution over one or more network connections.

In an embodiment, the machine-learning driven DBMS is all or of or any combination of: one or more of the MLAs 102, the parser 103, the optimizer 104, the AMPs 105, the database statistics 106, and/or the workload scheduler/manager 107.

At 210, the machine-learning driven DBMS inputs database constructs generated by a database optimizer (such as optimizer 104) as input to a trained MLA 102. The database constructs include the low level data produced by the optimizer 104 for producing execution plans for executing queries or portions of queries (such as loading tables, etc.). Some of these database constructs were discussed above with the FIG. 1, such as number of joins, types of joins, number of spools, cardinality of spools, types of tables, hardware and software identifiers for hardware and software resources, costs determined by optimizer 104 for resources and/or a query execution plan, steps of an execution plan, parallel steps, serial steps, etc. The low-level execution information produced by the optimizer 104 for the database operation is provided as the input to the trained MLA 102.

In an embodiment, at 211, the machine-learning driven DBMS inputs the database constructs as query execution plans produced by the optimizer 104 for a query (the database operation is execution of a query within the DBMS).

In an embodiment of 211 and at 212, the machine-learning driven DBMS identifies at least one of the database constructs as a least-cost query execution plan that was selected from the query execution plans by the optimizer 104.

In an embodiment of 212 and at 213, the machine-learning driven DBMS identifies individual pieces of the least cost query execution plan as: a total number of spools used, cardinality for tables with any intermediate results used, a total number of merge joins, a total number of hash joins, references for the spools, and cost per database resource (hardware and/or software) assigned by the optimizer 104.

At 220, the machine-learning driven DBMS obtains a database operation predictor/estimator value from the trained MLA 102 as an output based on the optimizer-produced database constructs supplied as input at 210.

In an embodiment, at 221, the machine-learning driven DBMS acquires the predictor value as an estimated CPU execution time for one or more AMPs 105 to execute when processing the database operation.

In an embodiment, at 222, the machine-learning driven DBMS acquires the predictor value as an estimated number of I/O operations performed by one or more AMPs 105 during execution when processing the database operation.

At 230, the machine-learning driven DBMS modifies at least one database construct based on the predictor value and the machine-learning driven DBMS produces a modified database construct.

In an embodiment, at 231, the machine-learning driven DBMS changes a scheduled execution time for the database operation as the modified database construct.

In an embodiment, at 232, the machine-learning driven DBMS changes a workgroup assigned to the database operation in a workload management system (such as the workload scheduler/manager 107) as the modified database construct.

At 240, the machine-learning driven DBMS processes the database operation with the database constructs and the modified database construct(s).

In an embodiment, at 250, the machine-learning driven DBMS stores the predictor in database statistics (such as statistics 106) associated with the database operation, the database constructs, and the modified database construct(s).

In an embodiment of 250 and at 251, the machine-learning driven DBMS renders an interface from the statistics 106 depicting relationships between the database operation, the predictor value, the database constructs, and the modified database construct(s) with respect to other instances of the database operation, other predictor values provided by the MLA 102, other database constructs, and other modified database constructions. This permits database operations and the database constructs to be visual evaluated for purposes of identifying problem database resources and/or database constructs to better optimize the execution of the database operation within the DBMS.

The predictor value is processed for managing the DBMS and or driving the processing of database operations within the DBMS.

It is to be noted, that the MLA 102 can be continually trained with actual values for database constructs and execution times, I/O operations, resource usage, such that the accuracy rate of the MLA 102 is continually improving allowing the DBMS to improve its efficiency over time as the predictor values increase in accuracy.

Figure 3:
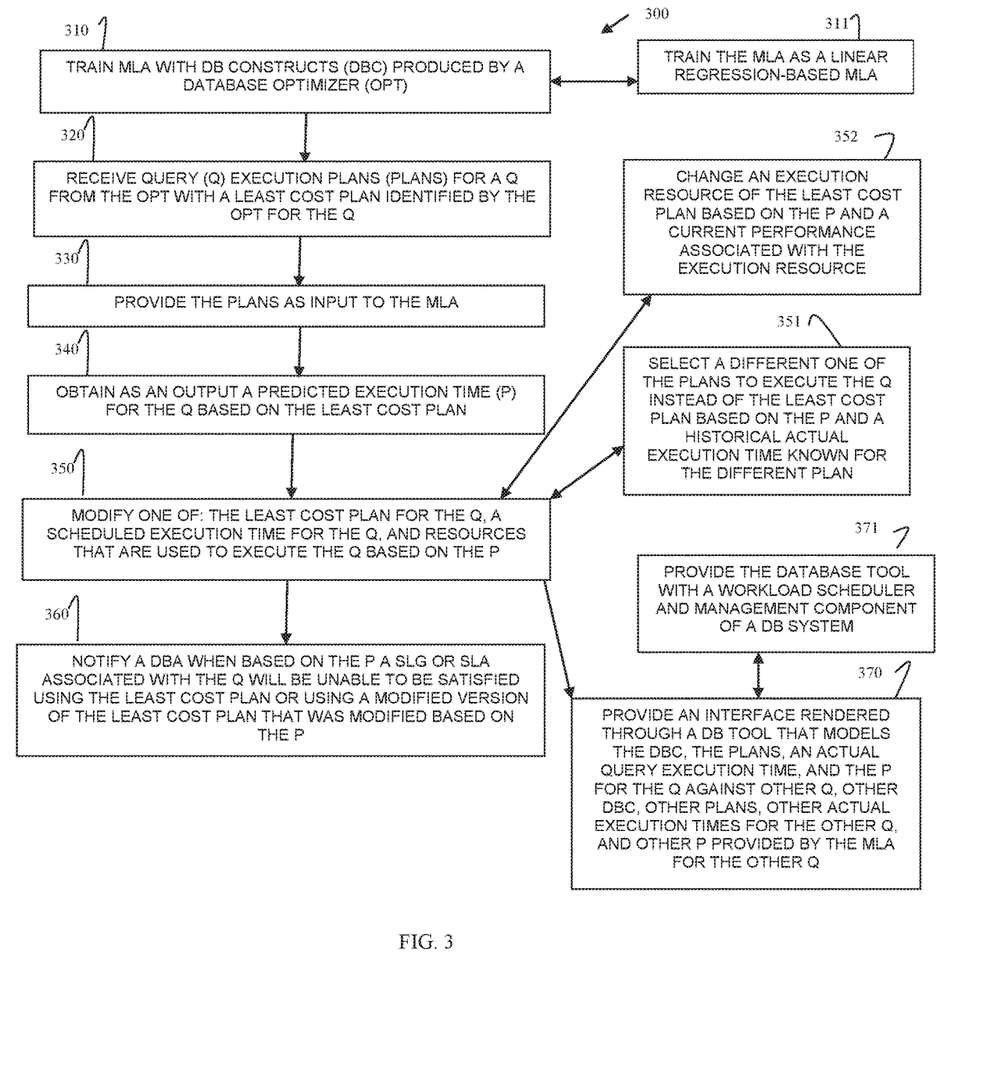
FIG. 3 is a diagram of another method for machine-learning driven database management, according to an example embodiment.

FIG. 3 is a diagram of another method 300 for machine-learning driven database management, according to an embodiment. The method 300 is implemented as one or more software modules referred to as a "machine-learning database query manager." The machine-learning database query manager represents executable instructions that are programmed within memory or a non-transitory computer-readable medium and executed by one or more hardware processors of a device. The machine-learning database query manager may have access to one or more network connections during processing, which can be wired, wireless, or a combination of wired and wireless.

The machine-learning database query manager presents another and in some ways enhanced perspective of the processing discussed above with the FIGS. 1 and 2.

In an embodiment, the machine-learning database query manager is all of or any combination of: one or more of the MLAs 102, the parser 103, the optimizer 104, the AMPs 105, the database statistics 106, the workload scheduler/manager 107, and/or the method 200.

At 310, the machine-learning database query manager trains a MLA 102 with database constructs produced by a database optimizer 104.

In an embodiment, at 311, the machine-learning database query manager trains the MLA 102 as a linear regression-based MLA using actual query execution times for queries as known/expected values to output by the MLA 102 and using the execution plans and the least cost execution plans generated by the optimizer 104 for those training queries as input during the training session.

At 320, the machine-learning database query manager receives query execution plans for a query from the optimizer 104 along with an identification made by the optimizer 104 of the least cost plan from the plans.

At 330, the machine-learning database query manager provides the plans as input to the trained MLA 102.

At 340, the machine-learning database query manager obtains as an output the predicted execution time for the query based on the least cost plan selected by the optimizer 104.

At 350, the machine-learning database query manager modifies one of: the least cost plan for the query, a scheduled execution time for the query, and/or resources that are used to execute the query based on the predicted execution time provided by the MLA 102.

In an embodiment, at 351, the machine-learning database query manager selects a different one of the query execution plans to execute the query instead of the least cost execution plan based on the predicted execution time and an historical actual execution time known for the different execution plan.

In an embodiment, at 352, the machine-learning database query manager changes an execution resource of the least cost plan based on the predicted execution time and a current performance noted and associated with the execution resource.

In an embodiment, at 360, the machine-learning database query manager notifies a DBA when based on the predicted execution time a SLG or SLA associated with the query will be unable to be satisfied using the least cost plan or using a modified version of the least cost plan that was modified based on the predicted execution time for the query provided by the MLA 102.

In an embodiment, at 370, the machine-learning database query manager provides an interface rendered through a database tool that models the database constructs, the execution plans, an actual query execution time, and the predicted query execution time for the query against other database constructs, other plans, other actual execution times for other queries, and other predicted execution times for the other queries provided by the MLA 102 for the other queries.

In an embodiment of 370 and at 371, the machine-learning database query manager provides the database tool with a workload scheduler and management component of the DBMS (such as within the workload scheduler and manager 107).

Figure 4:
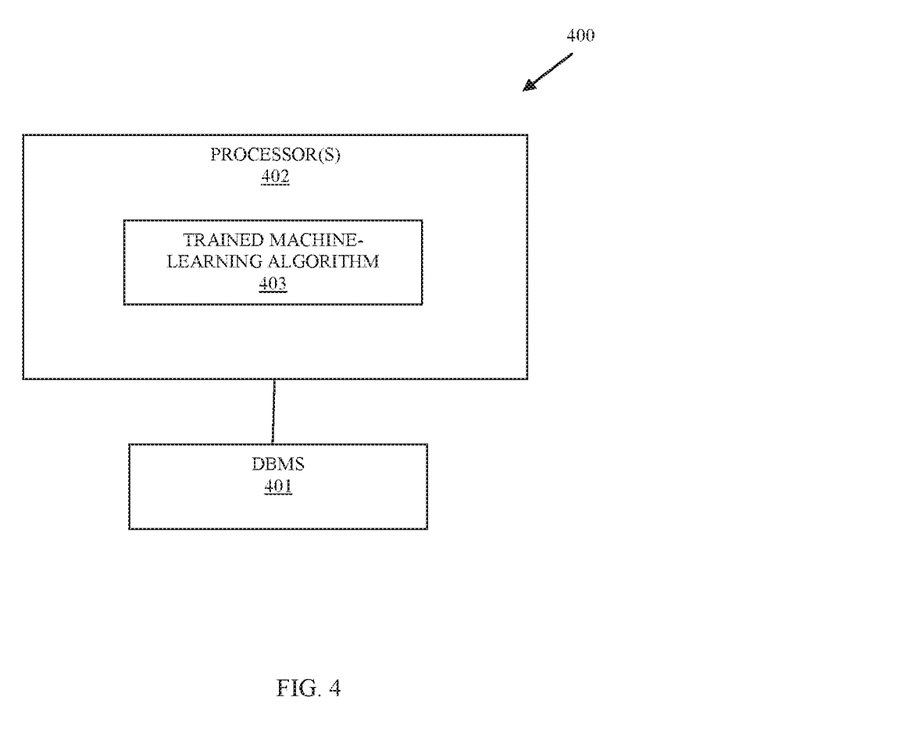
FIG. 4 is a diagram of a system for machine-learning driven database management, according to an example embodiment.

FIG. 4 is a diagram of a system 400 for machine-learning driven database management, according to an example embodiment. The system 400 includes a variety of hardware components and software components. The software components are programmed as executable instructions into memory and/or a non-transitory computer-readable medium for execution on the hardware components (hardware processors). The system 400 includes one or more network connections; the networks can be wired, wireless, or a combination of wired and wireless.

The system 400 implements, inter alia, the processing discussed above with the FIGS. 1-3.

The system 400 includes: a DBMS 401, at least one hardware processor 402 and a non-transitory computer-readable storage medium having executable instructions representing a MLA 403.

The MLA 403 when executed on the at least one hardware processor 402 from the non-transitory computer-readable storage medium performs processing to: i) receive as input database constructs produced by a database optimizer for a database operation of the DBMS 401; and ii) provide as output a predicted value relevant to one of: one or more of the database constructs and the database operation.

The DBMS 401 is configured to process the predict value to determine whether to modify one of: the one or more database constructs and the database operation before processing the database operation within the DBMS 401.

In an embodiment, the DBMS 401 includes the system 100.

In an embodiment, the MLA 403 is the MLA 102.

In an embodiment, the database optimizer is the optimizer 104.

In an embodiment, the system 400 includes a plurality of separately trained instances of the MLA 403, each MLA configured to perform processing to produce a different predicted value for a different database construct or different aspect associated with the database operation. In an embodiment, output of one MLA 403 is used as input to another MLA 403 (chained MLAs 403).

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
   inputting database constructs generated by a database optimizer as an input to a trained machine-learning algorithm, wherein the database constructs include a plurality of query execution plans to execute a query;
   obtaining a database operation predictor from the machine-learning algorithm as an output;
   modifying one of the database constructs based on the database operation predictor producing a modified database construct; and
   processing the query with the database constructs and the modified database construct.

2. The method of claim 1, wherein inputting further includes identifying at least one database construct as a least cost query execution plan identified from the plurality of query execution plans generated by the database optimizer.

3. The method of claim 2, wherein identifying further includes identifying individual pieces of the least cost query execution plan as: a total number of spools used, cardinality for tables with any intermediate results used, a total number of merge joins, a total number of hash joins, nested loop joins, references for the spools, and costs per database resource assigned by the database optimizer.

4. The method of claim 1, wherein obtaining further includes acquiring the database operation predictor as an estimated Central Process Unit (CPU) execution time for one or more Access Module Processors to execute when processing the query.

5. The method of claim 1, wherein obtaining further includes acquiring the database operation predictor as an estimated number of Input/Output (I/O) operations performed by one or more Access Module Processors during execution when processing the query.

6. The method of claim 1, modifying further includes changing a scheduled execution time for the query as the modified database construct.

7. The method of claim 1, wherein modifying further includes changing a scheduled execution time for execution of the query as the modified database construct.

8. The method of claim 1, wherein modifying further includes changing a workgroup assigned to the query as the modified database construct.

9. The method of claim 1 further comprising, storing the database operation predictor in database statistics associated with the query and the database constructs.

10. The method of claim 9 further comprising, rendering an interface from the database statistics depicting relationships between the query, the database operation predictor, the database constructs, and the modified database construct with respect to other instances of the database operation, other database operation predictors, other database constructs, and other modified database constructs.

11. A method comprising:
    training a machine-learning algorithm with database constructs produced by a database optimizer;
    receiving a plurality of query execution plans for to execute a query from the database optimizer with a least cost query execution plan identified from among the plurality of query execution plans by the database optimizer for the query;
    providing the query execution plans as input to the machine-learning algorithm;
    obtaining as an output a predicted execution time for the query based on the least cost query execution plan; and
    modifying the least cost query execution plan for the query based on the predicted execution time.

12. The method of claim 11 further comprising, notifying a database administrator when based on the predicted execution time a Service Level Goal (SLG) or Service Level Agreement (SLA) associated with the query will be unable to be satisfied using the least cost query execution plan or using a modified version of the least cost query execution plan that was modified based on the predicted execution time.

13. The method of claim 11 further comprising:
    providing an interface rendered through a database tool that models the database constructs, the query execution plans, an actual query execution time for the query, and the predicted execution time for the query against other queries having other database constructs, other query execution plans, other actual query execution times for the other queries, and other predicted execution times provided by the machine-learning algorithm for the other queries.

14. The method of claim 13, wherein providing further includes providing the database tool within a workload scheduler and management component of a database system.

15. The method of claim 11, wherein training further includes training the machine-learning algorithm as a linear regression-based machine-learning algorithm.

16. The method of claim 11, wherein modifying further includes selecting a different one of the query execution plans to execute the query instead of the least cost query execution plan based on the predicted execution time and a historical actual execution time known for the different query execution plan.

17. The method of claim 11, wherein modifying further includes changing an execution resource of the least cost query execution plan based on the predicted query execution time and a current performance associated with the execution resource.

18. A system, comprising:
    a database management system;
    at least one hardware processor;
    a non-transitory computer-readable storage medium having executable instructions representing a trained machine-learning algorithm;
    the machine learning algorithm configured to execute on the at least one hardware processor from the non-transitory computer-readable storage medium and to perform processing to:
    i) receive as input database constructs produced by a database optimizer for a query, wherein the database constructs include a plurality of query execution plans to execute the query; and
    ii) provide as output a predicted value relevant to one of: one or more of the database constructs and the query;
    wherein the database management system is configured to process the predicted value to determine whether to modify the query before processing the query within the database management system.

19. The system of claim 18, wherein the predicted value is an estimated query execution time for the query and the database operation is execution of a query execution plan for the query within the database management system.

* * * * *